(12) United States Patent
Hibi et al.

(10) Patent No.: US 10,524,605 B2
(45) Date of Patent: Jan. 7, 2020

(54) MULTISTAGE STEAMING MACHINE

(71) Applicant: NISSIN FOODS HOLDINGS CO., LTD., Osaka (JP)

(72) Inventors: Takaaki Hibi, Tokyo (JP); Shigeru Yasuda, Tokyo (JP); Kohei Nomura, Shiga (JP); Mitsuru Tanaka, Tokyo (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 0 days.

(21) Appl. No.: 15/315,757

(22) PCT Filed: Jun. 4, 2014

(86) PCT No.: PCT/JP2014/002972
§ 371 (c)(1),
(2) Date: Dec. 2, 2016

(87) PCT Pub. No.: WO2015/186156
PCT Pub. Date: Dec. 10, 2015

(65) Prior Publication Data
US 2017/0119193 A1 May 4, 2017

(51) Int. Cl.
*A47J 27/16* (2006.01)
*A23L 7/109* (2016.01)

(52) U.S. Cl.
CPC ............... *A47J 27/16* (2013.01); *A23L 7/109* (2016.08); *A23V 2002/00* (2013.01)

(58) Field of Classification Search
CPC ... A23L 7/109; A23L 5/13; A23L 5/17; A23V 2002/99; A23V 2300/21; A23V 2300/00; A47J 27/16

USPC .............. 99/443, 410, 417, 360–365, 430 C; 219/401
See application file for complete search history.

(56) References Cited

U.S. PATENT DOCUMENTS 5,960,703 A 10/1999 Jara et al.
2015/0017299 A1 1/2015 Hibi et al.

FOREIGN PATENT DOCUMENTS

| EP | 2818054 A1 * | 12/2014 | ............ A47J 27/04 |
| JP | 55-4736 | 1/1980 | |
| JP | 57-156717 | 9/1982 | |

(Continued)

OTHER PUBLICATIONS

Japanese to English machine translation of JP 2008-161559.*

(Continued)

*Primary Examiner* — Michael G Hoang
(74) *Attorney, Agent, or Firm* — Greenblum & Bernstein, P.L.C.

(57) ABSTRACT

A multistage steaming machine is configured such that a steam chamber main body portion in which steam is actually supplied to a group of noodle strings is provided with: a tunnel-shaped noodle introducing portion extending from the steam chamber main body portion in an obliquely downward direction; and a tunnel-shaped noodle discharging portion similarly extending from the steam chamber main body portion in an obliquely downward direction. A vertical position of an inlet end of the noodle introducing portion and a vertical position of an outlet end of the noodle discharging portion are lower than a vertical position of a lower end portion of the steam chamber main body portion.

3 Claims, 5 Drawing Sheets

(56) References Cited

FOREIGN PATENT DOCUMENTS

| | | |
|---|---|---|
| JP | 6-62961 | 3/1994 |
| JP | 2004-195190 | 7/2004 |
| JP | 2008-161559 | 7/2008 |
| JP | 2010-017167 | 1/2010 |
| JP | 2014-113276 | 6/2014 |
| JP | 2014-113277 | 6/2014 |
| WO | 2013125529 | 8/2013 |

OTHER PUBLICATIONS

English Translation of the Written Opinion of the International Search Authority.*
Manual translation to JP 55/4736.*
Extended European Search Report issued in Patent Application No. 14893843.4, dated Sep. 28, 2017.
International Search Report issued in Patent Application No. PCT/JP2014/002972, dated Sep. 9, 2014.
Taiwanese Office Action from Application No. 103119598 dated Apr. 24, 2017 with English language translation.
Singapore Search Report and Written Opinion in Singapore Application No. 11201610061P, dated Feb. 8, 2018.

* cited by examiner

MULTISTAGE STEAMING MACHINE

TECHNICAL FIELD

The present invention relates to a multistage steaming machine, and particularly to a multistage steaming machine which can be suitably utilized when steam-boiling a group of noodle strings.

BACKGROUND ART

Instant noodles are produced in such a manner that cut raw noodle strings are subjected to a predetermined treatment and then dried. The instant noodles are instant foods that can be reconstituted and eaten in such a manner that: boiling water is poured, and the noodles are left for several minutes; or the noodles are boiled in a pot or the like for several minutes. To improve this reconstitution property, the group of noodle strings is subjected to a steam-boiling step in a process of producing the instant noodles.

To execute the steam-boiling step, a steaming machine is installed in a noodle producing factory. At this time, to reduce an installation space, a plurality of stages may be formed in the steaming machine. To be specific, the group of noodle strings which is a target to be steam-boiled is conveyed on a conveyor so as to go and return plural times in the steaming machine in a longitudinal direction and is steam-boiled by steam introduced into the steaming machine while being conveyed. Various types of multistage steaming machines have been released.

Further, for the purpose of energy saving in recent years, a method of more efficiently utilizing the steam used in the steaming machine has been studied. For example, PTL 1 discloses a method in which: conveyors are provided at several stages in a steaming machine; superheated steam is used in the steaming machine; and leakage of the steam is prevented by making pressure in a steam chamber negative.

CITATION LIST

Patent Literature

PTL 1: Japanese Laid-Open Patent Application Publication No. 6-62961

SUMMARY OF INVENTION

Technical Problem

The present inventors have reconsidered conventional steaming machines and have found that there is still room for improvement regarding effective utilization of steam. Especially, there is a possibility that excess steam is discharged to outside through an inlet side and outlet side for the group of noodle strings in the conventional steaming machines, and therefore, the steam is wasted.

The present invention was made to solve such problem, and an object of the present invention is to provide a steaming machine that improves efficiency of a steam-boiling step and therefore realizes energy saving.

Solution to Problem

The present inventors have diligently studied, and as a result, have found that the effective utilization of the steam is realized by a multistage steaming machine configured such that: a steam chamber main body portion in which the steam is supplied to the group of noodle strings is provided with a tunnel-shaped noodle introducing portion extending in an obliquely downward direction from the steam chamber main body portion and a tunnel-shaped noodle discharging portion extending similarly; and a vertical position of an inlet side of the noodle introducing portion and a vertical position of an outlet side of the noodle discharging portion are located lower than a lower end portion of the steam chamber main body portion.

To be specific, an invention according to claim 1 is a multistage steaming machine including: 1) a steam chamber main body portion including two side portions facing each other in a first direction, one of the two side portions being a side portion of an inlet side through which a group of noodle strings is introduced, the other of the two side portions being a side portion of an outlet side through which the group of noodle strings is discharged; 2) a tunnel-type noodle introducing portion connected to an upper portion of the inlet side of the steam chamber main body portion and provided such that the group of noodle strings is carried in to the steam chamber main body portion in an obliquely upward direction; 3) a tunnel-type noodle discharging portion connected to the outlet side of the steam chamber main body portion and provided such that the group of steam-boiled noodle strings is carried out from the steam chamber main body portion in an obliquely downward direction; 4) one or a plurality of conveyors provided at multiple stages such that the group of noodle strings which has been introduced from the noodle introducing portion through the upper portion of the steam chamber main body portion into the steam chamber main body portion goes and returns plural times along the first direction in the steam chamber main body portion to be conveyed to a lower side of the steam chamber main body portion and is then discharged through the noodle discharging portion; and 5) one or a plurality of steam pipes configured to supply steam to the steam chamber main body portion, wherein an inlet end of the noodle introducing portion and an outlet end of the noodle discharging portion are located lower than a lower end surface of the steam chamber main body portion.

Further, the present inventors have found that in the multistage steaming machine recited in claim 1, it is effective to provide the steam pipes at an upper portion side of the steam chamber main body portion, that is, at the conveyor of an upper stage.

To be specific, an invention according to claim 2 is configured such that in the multistage steaming machine according to claim 1, the one or a plurality of steam pipes are provided at an upper portion side in the steam chamber main body portion.

Advantageous Effects of Invention

According to the multistage steaming machine of the present invention, since the inlet end of the noodle introducing portion and the outlet end of the noodle discharging portion are located lower than the lower end surface of the steam chamber main body portion, the leakage of the steam from the steam chamber main body portion to the outside can be suppressed.

Therefore, the steam can be efficiently utilized without waste by using the multistage steaming machine of the present invention. On this account, the multistage steaming machine of the present invention can be suitably used while satisfying a request of energy saving in recent years.

DESCRIPTION OF EMBODIMENTS

Hereinafter, embodiments of the present invention will be explained in reference to the drawings. In the following explanations and the drawings, the same reference signs are used for the same or corresponding components, and a repetition of the same explanation is avoided.

Entire Configuration

Figure 1:
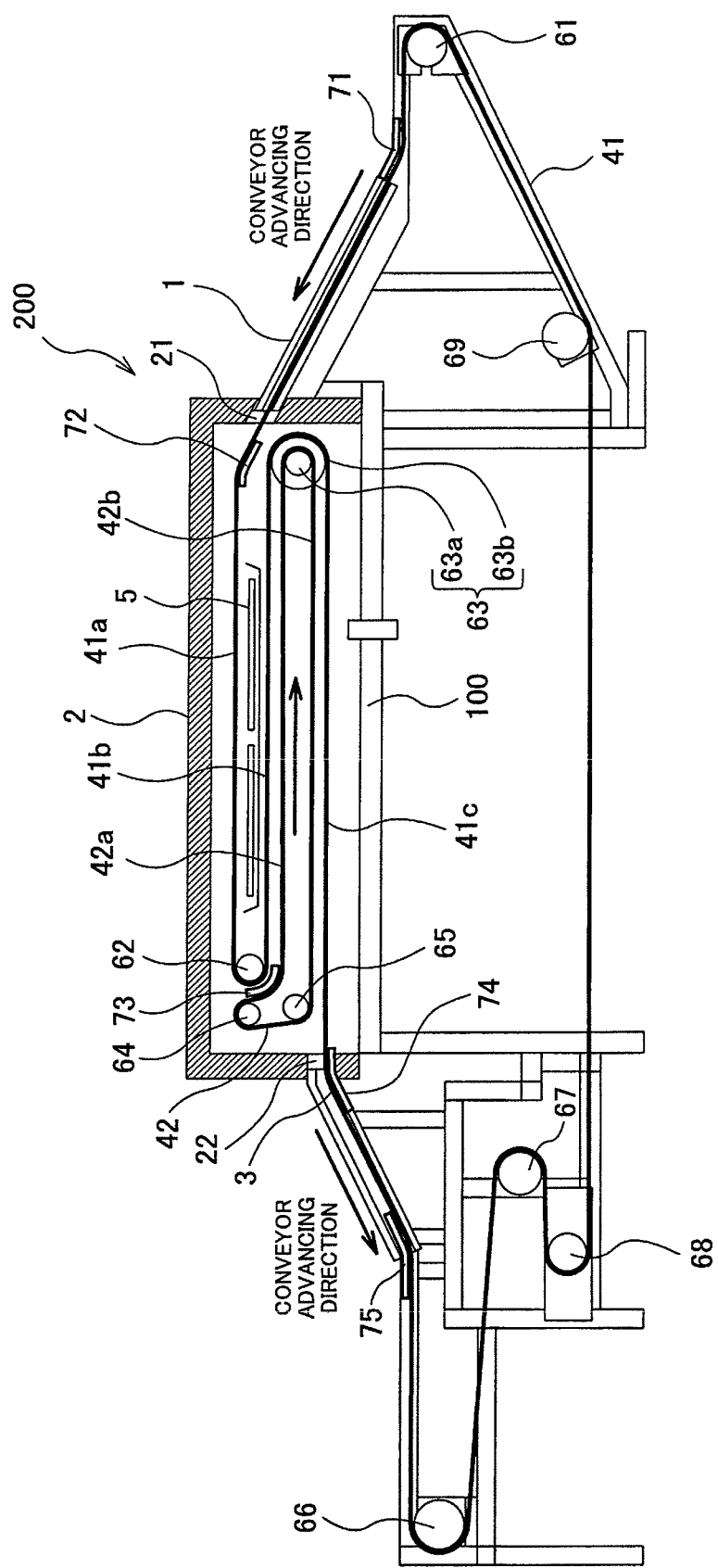
FIG. 1 is a cross-sectional view showing an entire configuration of a multistage steaming machine of Embodiment 1.

FIG. 1 is a cross-sectional side view of a multistage steaming machine of Embodiment 1. As shown in FIG. 1, a multistage steaming machine 200 includes: a steam chamber main body portion 2 including side portions facing each other in a first direction, an inlet side through which a group of noodle strings is introduced and an outlet side through which the group of noodle strings is discharged being provided at the respective side portions; a tunnel-type noodle introducing portion 1 connected to an upper portion of the inlet side of the steam chamber main body portion 2 and arranged such that the group of noodle strings is carried into the steam chamber main body portion 2 in an obliquely upward direction; and a tunnel-type noodle discharging portion 3 connected to the outlet side of the steam chamber main body portion 2 and arranged such that the group of steam-boiled noodle strings is carried out from the steam chamber main body portion 2 in an obliquely downward direction. In the present description, a horizontal conveyance direction from the noodle introducing portion 1 toward the noodle discharging portion 3 in the steam chamber main body portion 2 is referred to as a "forward direction", and a horizontal conveyance direction from the noodle discharging portion 3 toward the noodle introducing portion 1 in the steam chamber main body portion 2 is referred to as an "opposite direction." Therefore, the above first direction includes both the "forward direction" and the "opposite direction."

The multistage steaming machine 200 further includes: a conveyor provided at multiple stages such that the group of noodle strings introduced from the noodle introducing portion 1 through an upper portion 21 of the inlet side of the steam chamber main body portion 2 goes and returns plural times in the steam chamber main body portion 2 in the forward direction and the opposite direction, the group of noodle strings is then conveyed to a lower side of the steam chamber main body portion 2, and the group of noodle strings is discharged through the noodle discharging portion 3; and a plurality of steam pipes 5 configured to supply steam (heated steam) to the steam chamber main body portion 2.

An inlet end of the noodle introducing portion 1 and an outlet end of the noodle discharging portion 3 are arranged lower than a lower end surface of the steam chamber main body portion 2.

The conveyor includes: a first conveyor 41 configured to convey the group of noodle strings from the inlet end of the noodle introducing portion 1 to the steam chamber main body portion 2 and further convey the group of noodle strings in the forward direction to the noodle discharging portion 3; and a second conveyor 42 configured to receive the group of noodle strings, which has been conveyed in the forward direction in the steam chamber main body portion 2, from the first conveyor 41, convey the group of noodle strings in the opposite direction to the inlet side of the steam chamber main body portion 2, and transfer the noodle strings to the first conveyor 41 again. Detailed structures of the first conveyor 41 and the second conveyor 42 will be described later.

It should be noted that the noodle introducing portion 1, the steam chamber main body portion 2, and the noodle discharging portion 3 are placed on a support base 100.

Explanations of Respective Portions

Noodle Introducing Portion

As shown in FIG. 1, the noodle introducing portion 1 is a long and thin, linear, tunnel-type passage and is connected to the upper portion 21 of the inlet side of the steam chamber main body portion 2. The first conveyor 41 passes through an inside of the noodle introducing portion 1.

A size of a cross section of the noodle introducing portion 1 is sufficient if the first conveyor 41 and the group of noodle strings placed on the first conveyor 41 can pass through the noodle introducing portion 1. A material of the noodle introducing portion 1 is not especially limited but is suitably a material, such as stainless steel, having rigidity and a heat retaining property. Further, it is preferable that the noodle introducing portion 1 be configured such that steam filled in the noodle introducing portion 1 does not leak to the outside.

Figure 5:
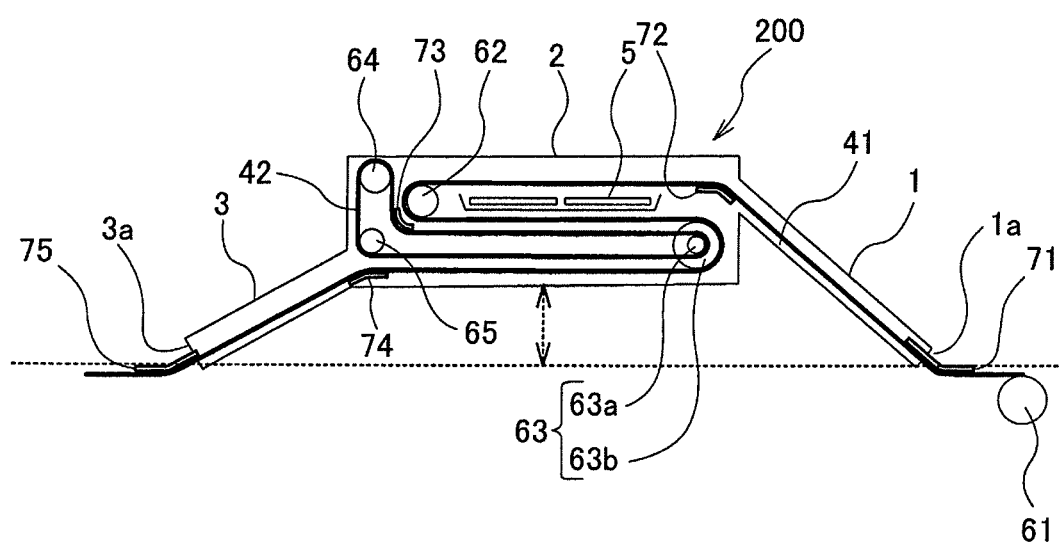
FIG. 5 is a cross-sectional view showing the major components of the multistage steaming machine of Embodiment 1.

Further, as described above, an inlet end 1a of the noodle introducing portion 1 is located lower than a lower end portion of the steam chamber main body portion 2 (see FIG. 5). In a steam-boiling step, the steam filled in the steam chamber main body portion 2 is also filled in the inlet end 1a of the noodle introducing portion 1. Since the inlet end 1a is located lower than the lower end portion of the steam chamber main body portion 2, the leakage of the steam to the outside can be suppressed, and the steam can be efficiently utilized. To be specific, the heated steam tends to flow upward, so that if the inlet end 1a of the noodle introducing portion 1 is located higher than the lower end portion of the steam chamber main body portion 2, the heated steam may flow out through the inlet end 1a. Such flow-out of the steam does not occur by the noodle introducing portion 1 according to the present embodiment.

Steam Chamber Main Body Portion

Embodiment 1 shown in FIG. 1 describes the steam chamber main body portion 2 in which the group of noodle strings conveyed from the noodle introducing portion 1 by the first conveyor 41 is steam-boiled through three stages arranged vertically.

A material of the steam chamber main body portion 2 is not especially limited but is suitably a material, such as stainless steel, having rigidity and a heat retaining property. Further, to prevent the steam, filled in the steam chamber main body portion 2, from leaking to the outside as much as possible, it is preferable that the steam chamber main body portion 2 be configured to be able to be sealed as much as possible, such as a connection part between the noodle introducing portion 1 and the noodle discharging portion 3. With this configuration, the steam supplied from the steam pipes 5 can be gradually filled in the steam chamber main body portion 2 from an upper portion of the steam chamber main body portion 2. Therefore, the steam can be easily filled in the entire steam chamber main body portion 2, and the group of noodle strings in the steam chamber main body portion 2 can be effectively exposed to the steam.

Noodle Discharging Portion

The noodle discharging portion 3 is a long and thin, linear, tunnel-type passage and is connected to a lower portion 22 of the outlet side of the steam chamber main body portion 2. Further, the first conveyor 41 passes through an inside of the noodle discharging portion 3.

As with the noodle introducing portion 1, a size of a cross-sectional portion of the noodle discharging portion 3 is sufficient if the first conveyor 41 and the group of noodle strings placed on the first conveyor 41 can pass through the noodle discharging portion 3.

A material of the noodle discharging portion 3 is not especially limited but is suitably a material, such as iron, aluminum, resin, or the like. Further, it is preferable that the noodle discharging portion 3 be configured to prevent the steam filled therein from leaking to the outside.

Further, as described above, an outlet end 3a of the noodle discharging portion 3 is located lower than the lower end portion of the steam chamber main body portion 2 (see FIG. 5). In the steam-boiling step, the steam filled in the steam chamber main body portion 2 is also filled in the outlet end of the noodle discharging portion 3. Since the outlet end is located as above, the leakage of the steam to the outside can be suppressed, and the steam can be efficiently utilized.

Conveyor

The first conveyor 41 and the second conveyor 42 are provided at multiple stages such that: the group of noodle strings introduced from the noodle introducing portion 1 and the upper portion 21 of the inlet side of the steam chamber main body portion 2 goes and returns plural times in the steam chamber main body portion 2 in the forward direction and the opposite direction to be conveyed to the lower side of the steam chamber main body portion 2; and the group of noodle strings is discharged through the noodle discharging portion 3.

The first conveyor 41 shown in FIG. 1 is a conveyor including mesh and endlessly circulates by sprockets and guides. A first sprocket 61 is located outside the steam chamber main body portion 2 and in front of the noodle introducing portion 1 so as to guide the first conveyor 41, and a first guide 71 is located outside the steam chamber main body portion 2 and at the inlet end of the noodle introducing portion 1 so as to guide the first conveyor 41.

Sixth to ninth sprockets (66-69) are located outside the steam chamber main body portion 2 and lower than the noodle discharging portion 3 so as to guide the first conveyor 41.

A second guide 72 and a third sprocket 63 are vertically arranged in the steam chamber main body portion 2 and close to the noodle introducing portion 1 so as to guide the first conveyor 41. A second sprocket 62 that guides the first conveyor 41 and a third guide 73 that guides the second conveyor 42 are vertically arranged in the steam chamber main body portion 2 and close to the noodle discharging portion 3. The third sprocket 63 coaxially includes a small-diameter portion 63a and a large-diameter portion 63b, and the large-diameter portion 63b guides the first conveyor 41. A fourth guide 74 and fifth guide 75 which guide the first conveyor 41 are provided at both respective end portions of the noodle discharging portion 3.

The second conveyor 42 is a conveyor including mesh and is endlessly provided in the steam chamber main body portion 2. A fourth sprocket 64 and a fifth sprocket 65 are vertically arranged in the steam chamber main body portion 2 and closer to the noodle discharging portion 3 than the second sprocket 62. The second conveyor 42 is suspended by the fourth sprocket 64, the fifth sprocket 65, and the small-diameter portion 63a of the third sprocket 63.

An uppermost stage portion of the first conveyor 41 forms a first region 41a. A linear region connecting the second sprocket 62 and the large-diameter portion 63b forms a second region 41b. The second region 41b is located higher than a third region 42a connecting the third guide 73 and the small-diameter portion 63a. A fourth region 42b connecting the small-diameter portion 63a and the fifth sprocket 65 is located higher than a fifth region 41c connecting the large-diameter portion 63b and the fourth guide 74.

Operations of Conveyor

The first conveyor 41 is first wound around the first sprocket 61, is supported by the first guide 71, and enters into the noodle introducing portion 1. The first conveyor 41 moves in the noodle introducing portion 1 in an obliquely upward direction, is then supported by the second guide 72, and extends substantially horizontally along the forward direction. Further, the first conveyor 41 is wound around the second sprocket 62, is turned over, extends in the opposite direction, is wound around the large-diameter portion 63b of the third sprocket 63, is turned over, and moves in the forward direction. The first conveyor 41 is supported by the fourth guide 74 in front of the noodle discharging portion 3, moves in an obliquely downward direction, is supported by the fifth guide 75, and gets out of the noodle discharging portion 3.

After the first conveyor 41 gets out of the noodle discharging portion 3, the first conveyor 41 is wound around the sixth to ninth sprockets (66-69) and moves to the first sprocket 61. As above, the first conveyor 41 endlessly circulates.

To be specific, the first conveyor 41 passes through the noodle introducing portion 1 from a position in front of the noodle introducing portion 1, enters into the steam chamber main body portion 2, moves in the forward direction, then moves in the opposite direction, further moves in the forward direction, and then gets out of the noodle discharging portion 3 to the outside. Further, the first conveyor 41 moves in the forward direction, is turned over to the opposite direction, and again moves to the noodle introducing portion 1.

The second conveyor 42 is wound around the fourth sprocket 64, is guided by the third guide 73, moves in the opposite direction, is wound around the small-diameter portion 63a of the third sprocket 63, is turned over, and moves in the forward direction. The second conveyor 42 is wound around the fifth sprocket 65, moves upward, and again moves to the fourth sprocket 64. As above, the second conveyor 42 endlessly circulates.

The second conveyor 42 is provided such that: the group of noodle strings conveyed by the first conveyor 41 in the forward direction is received by the third region 42a when the first conveyor 41 is turned over at the second sprocket 62; the group of noodle strings is conveyed in the opposite direction; and the group of noodle strings is then transferred to the first conveyor 41 in the fifth region 41c. It is preferable that each of a belt of the first conveyor 41 and a belt of the second conveyor 42 be a belt, such as metal mesh, having through holes. Further, the above conveyors are just examples, and other types of conveyors are not excluded.

Steam Pipe

One or a plurality of steam pipes 5 through which the steam is supplied to the steam chamber main body portion 2 are provided in the steam chamber main body portion 2. In Embodiment 1, as shown in FIG. 1 for example, the steam pipes 5 are used to steam-boil the group of noodle strings conveyed to the first region 41a (first stage). To be specific, the steam pipes 5 are provided under the first region 41a so as to be able to steam-boil the group of noodle strings while the group of noodle strings conveyed from the noodle introducing portion 1 is conveyed in the forward direction. It should be noted that the steam pipes 5 may be provided above the first region 41a.

Further, as shown in FIG. 1, the steam pipes 5 are not provided under the third region 42a (second stage) and the fifth region 41c (third stage). However, the steam pipes 5 may be provided under the second stage or the third stage.

However, it is preferable that the steam pipes 5 be provided so as to correspond to at least an upper stage. To be specific, for example, when the steaming machine includes three stages as above, it is preferable that: the steam pipes 5 be provided under the first stage and the second stage; or as shown in FIG. 1, the steam pipes 5 be provided only under the first stage.

By providing the steam pipes 5 as above, a space where the steam pipes 5 are provided can be reduced, and therefore, a volume of the steam chamber main body portion 2 can be reduced.

Figure 2:
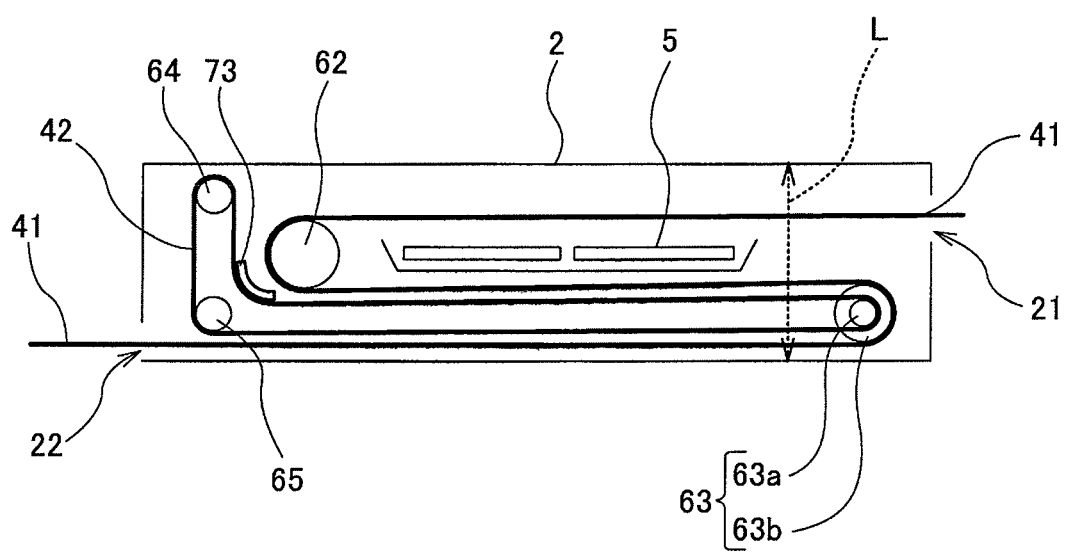
FIG. 2 is a cross-sectional view showing major components of the multistage steaming machine of Embodiment 1.

For example, when the steam pipes 5 are not provided under the second stage and the third stage, a configuration in which the space where the steam pipes 5 are provided is eliminated is effective. To be specific, as shown in FIG. 2, sizes of the sprockets located lower than the second stage can be reduced. Further, a vertical length L (see FIG. 2) of the steam chamber main body portion 2 and a length from the third stage to the lower end portion of the steam chamber main body portion 2 can be reduced.

As above, by reducing the volume of the entire steam chamber main body portion 2, the steam can be more efficiently utilized.

Movements of Group of Noodle Strings

The group of noodle strings conveyed by the conveyor is steam-boiled as below. First, the group of noodle strings which has not been steam-boiled yet is conveyed to a position in front of the noodle introducing portion 1. Typically, a different conveyor (not shown) is provided in front of the first sprocket 61, and the group of noodle strings which has not been steam-boiled yet is conveyed. The group of noodle strings transferred from the different conveyor is carried into the noodle introducing portion 1, carried in an obliquely upward direction that is an advancing direction of the first conveyor 41, and conveyed to the steam chamber main body portion 2.

The group of noodle strings conveyed into the steam chamber main body portion 2 is placed on the first conveyor 41 in the first region 41a and is steam-boiled by the steam from the steam pipes 5, provided under the first region 41a, while being conveyed in the forward direction. In the present invention, it is preferable that the steam pipes 5 be provided especially in the vicinity of the first stage in the steam chamber main body portion 2, and the group of noodle strings be steam-boiled. As above, the group of noodle strings is efficiently steam-boiled at an upper portion of the steam chamber main body portion 2. After that, the group of noodle strings is conveyed alternately in the forward direction and the opposite direction while being exposed to the steam that is gradually filled in the steam chamber main body portion 2. With this, the steam-boiling of the group of noodle strings is almost completed.

Specifically, the group of noodle strings is conveyed as below. The group of noodle strings is carried by the first conveyor 41 through the noodle introducing portion 1 into the steam chamber main body portion 2. The group of noodle strings conveyed in the forward direction in the first region 41a is turned over when the first conveyor 41 is turned over at the second sprocket 62. The group of noodle strings is guided by the third guide 73 and falls onto and is transferred to the second conveyor 42 in the third region 42a. The group of noodle strings is conveyed in the opposite direction. Further, the second conveyor 42 is turned over at the small-diameter portion 63a of the third sprocket 63, so that the group of noodle strings is also turned over. Then, the group of noodle strings falls onto and is transferred to the first conveyor 41 in the fifth region 41c. The group of noodle strings which has fallen onto the first conveyor 41 again is conveyed in the forward direction. The group of noodle strings conveyed by the first conveyor 41 in the forward direction is conveyed to the outlet side of a lower end of the steam chamber main body portion 2. The group of noodle strings is steam-boiled as above while being conveyed alternately in the forward direction and the opposite direction.

Then, the group of noodle strings is conveyed through the fourth guide 74 in the noodle discharging portion 3 in an obliquely downward direction and is carried from the outlet side of the noodle discharging portion 3 through the fifth guide 75 in a substantially horizontal direction. The group of noodle strings which has been steam-boiled is further carried by a conveyor (not shown) provided behind the sixth sprocket 66, and the process proceeds to optional steps, such as seasoning, pulling, cutting, and frying.

Group of Noodle Strings

Typically, in the steam-boiling step, plural groups of long noodle strings in an uncut state are steam-boiled. Therefore, for example, in the case of a producing line of instant noodles, a plurality of noodle strings in an uncut state are conveyed. Therefore, when the group of noodle strings is transferred between the first conveyor 41 and the second conveyor 42, the group of noodle strings can be smoothly moved. Since the group of noodle strings carries the steam, the steam can be filled in the steam chamber main body portion 2. To be specific, since the space in the steam chamber main body portion 2 is reduced as described above, and in addition, the group of noodle strings carries the steam, the steam from the steam pipes 5 easily reaches the lower side of the steam chamber main body portion 2.

Flow of Steam

The flow of the steam is described below. The steam supplied at the first stage that is the upper stage of the steam chamber main body portion 2 of the present invention is applied to the conveyed noodle strings. The steam is carried by the group of noodle strings as the conveyor advances. Further, the vaporized steam is gradually accumulated in the steam chamber main body portion 2 from an upper portion of the steam chamber main body portion 2. As the accumulation of the steam proceeds, the steam is filled to the lower side of the steam chamber main body portion 2 and then reaches the lower end portion of the steam chamber main body portion 2. Further, the steam reaches the inlet end of the noodle introducing portion 1 and the outlet end of the noodle discharging portion 3.

The group of noodle strings is continuously conveyed, so that when the group of noodle strings is strongly steam-boiled at the upper stage of the steam chamber main body portion 2, the group of noodle strings may be steam-boiled also by the steam accumulated in the steam chamber main body portion 2, the noodle introducing portion 1, and the noodle discharging portion 3 while being further conveyed in the forward direction and the opposite direction. As above, the multistage steaming machine of the present invention can efficiently steam-boil the group of noodle strings.

The group of noodle strings steam-boiled by the multistage steaming machine can be used variously. For example, the group of noodle strings which has been steam-boiled can be utilized as steam-boiled noodles (steamed noodles) by cutting and packaging the group of noodle strings which has been steam-boiled. Further, a fried noodle lump or a hot-air dried noodle lump can be produced in such a manner that the steam-boiled noodle strings are subjected to frying or hot-air drying after steps such as pulling, seasoning, cutting, and retainer filling. The retainer filling denotes that the group of steam-boiled noodle strings is stored in a porous metal frame called a retainer.

Duct

Ducts may be provided at an upper portion of the inlet end of the noodle introducing portion 1 and an upper portion of the outlet end of the noodle discharging portion 3. Excessive steam can be absorbed by the ducts. However, for the purpose of reducing the amount of steam used, it is preferable that pressure in the noodle introducing portion 1 and pressure in the noodle discharging portion 3 do not become negative.

Effective Utilization of Steam

Figure 3:
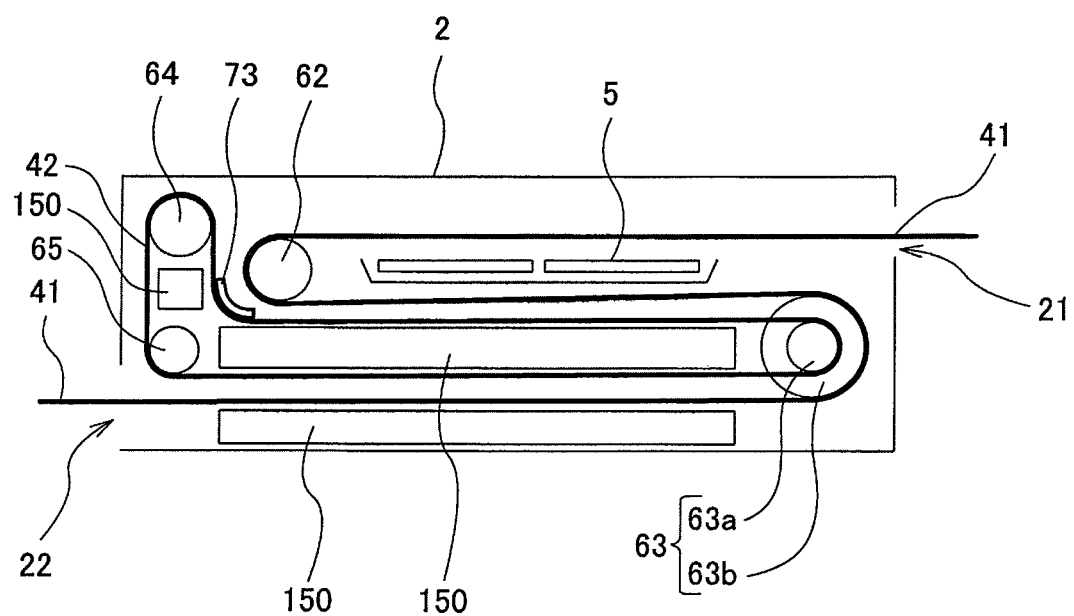
FIG. 3 is a cross-sectional view showing the major components of the multistage steaming machine of Embodiment 1.

As another component for efficiently utilizing the steam, as shown in FIG. 3, for example, a member 150 that is a plate-shaped body may be inserted so as to fill an internal space of the second conveyor 42. With this, the volume filled with the steam in the steam chamber main body portion 2 is reduced, so that the steam can be effectively utilized.

The space is not limited to the internal space of the conveyor and may be a different space. For example, a space between an upper end portion of the steam chamber main body portion 2 and the first region 41a, a space obliquely under the third sprocket 63, or the like may be used.

Embodiment 2

Figure 4:
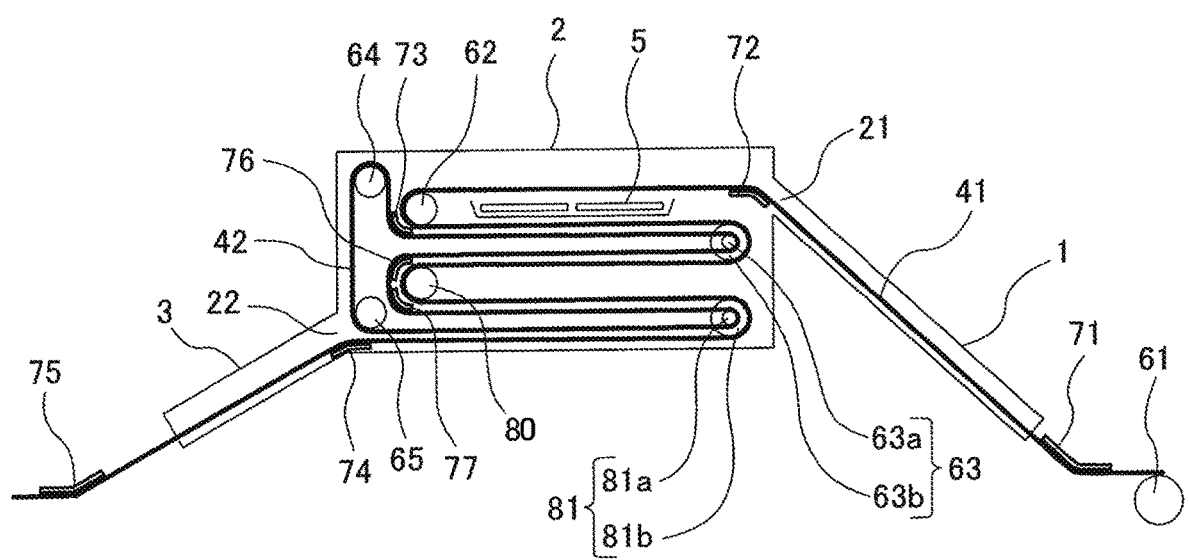
FIG. 4 is a cross-sectional view showing the major components of the multistage steaming machine of Embodiment 2.

For example, the configuration of the conveyor shown in Embodiment 1 is just one example. For example, as shown in FIG. 4, the conveyor may have five stages. The number of times of movements of the group of noodle strings in the forward direction and the opposite direction in Embodiment 2 shown in FIG. 4 is larger than that in Embodiment 1 showing the three-stage steaming machine by two times. To be specific, the group of noodle strings carried in from the noodle introducing portion 1 is conveyed through three stages in the forward direction, the opposite direction, and the forward direction and is further conveyed in the opposite direction and the forward direction. Therefore, the group of noodle strings is conveyed through five stages in total.

A tenth sprocket 80 and the fifth sprocket 65 are provided in the steam chamber main body portion 2 so as to be located under the third sprocket 63 and close to the noodle discharging portion 3. A sixth guide 76 and a seventh guide 77 are provided at an outer side of the tenth sprocket 80.

An eleventh sprocket 81 is provided in the steam chamber main body portion 2 so as to be located under the third sprocket 63. The eleventh sprocket 81 coaxially includes a small-diameter portion 81a and a large-diameter portion 81b.

As with Embodiment 1, the first conveyor 41 is wound around the second sprocket 62, is turned over, moves in the opposite direction, is wound around the large-diameter portion 63b of the third sprocket 63, is turned over, and moves in the forward direction. Then, unlike Embodiment 1, the first conveyor 41 is further wound around the tenth sprocket 80, is turned over, and moves in the opposite direction again. Then, the first conveyor 41 is wound around the large-diameter portion 81b of the eleventh sprocket 81, is turned over, and moves in the forward direction again. After that, as with Embodiment 1, the first conveyor 41 is supported by the fourth guide 74 in front of the noodle discharging portion 3, moves in an obliquely downward direction, is supported by the fifth guide 75, and gets out of the noodle discharging portion 3.

Further, the second conveyor 42 is wound around the fourth sprocket 64, is supported by the third guide 73, and moves in the opposite direction. Then, the second conveyor 42 is wound around the small-diameter portion 63a of the third sprocket 63 and is turned over. Furthermore, the second conveyor 42 moves in the forward direction and is turned over again by the sixth guide 76 and the seventh guide 77. The second conveyor 42 moves in the opposite direction, is wound around the small-diameter portion 81a of the eleventh sprocket 81, is turned over, moves in the forward direction, is wound around the fifth sprocket 65, and moves upward to the fourth sprocket 64 again. As above, the second conveyor 42 endlessly circulates.

In Embodiment 2, the conveyor has five stages as above. When the conveyor has five stages as above, a time for steam-boiling can be made long without increasing a space used in a noodle producing factory. Therefore, the speed of the manufacturing line using the conveyor having five stages becomes higher than that using the conveyor having three stages, and when the long-time steam-boiling is required, the conveyor having five stages is more advantageous than the conveyor having three stages.

In Embodiment 2, the steam pipes 5 are not provided for stages under the first stage. However, the steam pipes 5 may be provided under the second to fifth stages so as to be able to apply the steam. When the steam pipes 5 are provided only under the first stage, it is unnecessary to provide the steam pipes 5 under the second to fifth stages. Therefore, a method of reducing (filling) the space where the steam pipes 5 can be provided is effective. Specifically, one example is a method of reducing the space by: reducing the sizes of the sprockets of the conveyor at positions lower than the second stage in FIG. 4; and reducing a length between conveyor surfaces or a length between the conveyor and the lower end portion of the steam chamber main body portion 2. Another example is a method of inserting the member 150 (see FIG. 3), such as a plate-shaped body, into the space shown in FIG. 4. As above, the steam can be effectively utilized by reducing the volume filled with the steam in the steam chamber main body portion 2.

It should be noted that the conveyor has five or more stages.

INDUSTRIAL APPLICABILITY

The multistage steaming machine according to the present invention is useful when it is applied to an apparatus that steam-boils a group of noodle strings in a noodle producing factory.

REFERENCE SIGNS LIST 1 noodle introducing portion
2 steam chamber main body portion
3 noodle discharging portion
41 first conveyor
42 second conveyor
5 steam pipe
61 first sprocket
62 second sprocket
63 third sprocket
64 fourth sprocket
65 fifth sprocket
66 sixth sprocket
67 seventh sprocket
68 eighth sprocket
69 ninth sprocket
80 tenth sprocket
81 eleventh sprocket
71 first guide
72 second guide
73 third guide
74 fourth guide
75 fifth guide
76 sixth guide
77 seventh guide
100 support base
150 member
200 multistage steaming machine

The invention claimed is:

1. A multistage steaming machine comprising:
1) a steam chamber main body portion including two side portions facing each other in a first direction, one of the two side portions being a side portion of an inlet side through which a group of noodle strings is introduced, the other of the two side portions being a side portion of an outlet side through which the group of noodle strings is discharged;
2) a tunnel-type noodle introducing portion connected to an upper portion of the inlet side of the steam chamber main body portion and provided such that the group of noodle strings is carried in to the steam chamber main body portion in an obliquely upward direction;
3) a tunnel-type noodle discharging portion connected to the outlet side of the steam chamber main body portion and provided such that the group of steam-boiled noodle strings is carried out from the steam chamber main body portion in an obliquely downward direction;
4) one or a plurality of conveyors provided at multiple stages such that the group of noodle strings which has been introduced from the noodle introducing portion through the upper portion of the steam chamber main body portion into the steam chamber main body portion goes and returns plural times along the first direction in the steam chamber main body portion to be conveyed to a lower side of the steam chamber main body portion and is then discharged through the noodle discharging portion; and
5) one or a plurality of steam pipes configured to supply steam to the steam chamber main body portion, wherein
an inlet end of the noodle introducing portion and an outlet end of the noodle discharging portion are located lower than a lower end surface of the steam chamber main body portion; and
6) a member which contributes to reduce the volume filled with steam in the steam chamber main body portion, wherein the member which contributes to reduce the volume filled with the steam is provided in an internal space of the one or a plurality of conveyors and the member is also provided under the one or a plurality of steam pipes,
and the member which contributes to reduce the volume filled with the steam is provided above a conveyor which is derived from the one or a plurality of conveyors and passes the tunnel-type noodle discharging portion.

2. The multistage steaming machine according to claim 1, wherein the one or a plurality of steam pipes are provided at an upper portion side in the steam chamber main body portion.

3. The multistage steaming machine according to claim 1, wherein an additional member which contributes to reduce the volume filled with the steam is provided under the conveyor which passes the tunnel-type noodle discharging portion.

* * * * *